Jan. 22, 1957
B. H. TONGUE
NEUTRALIZED AMPLIFIER SYSTEM FOR ULTRAHIGH TO VERY HIGH FREQUENCY CONVERTER
Filed June 15, 1953
2,778,934
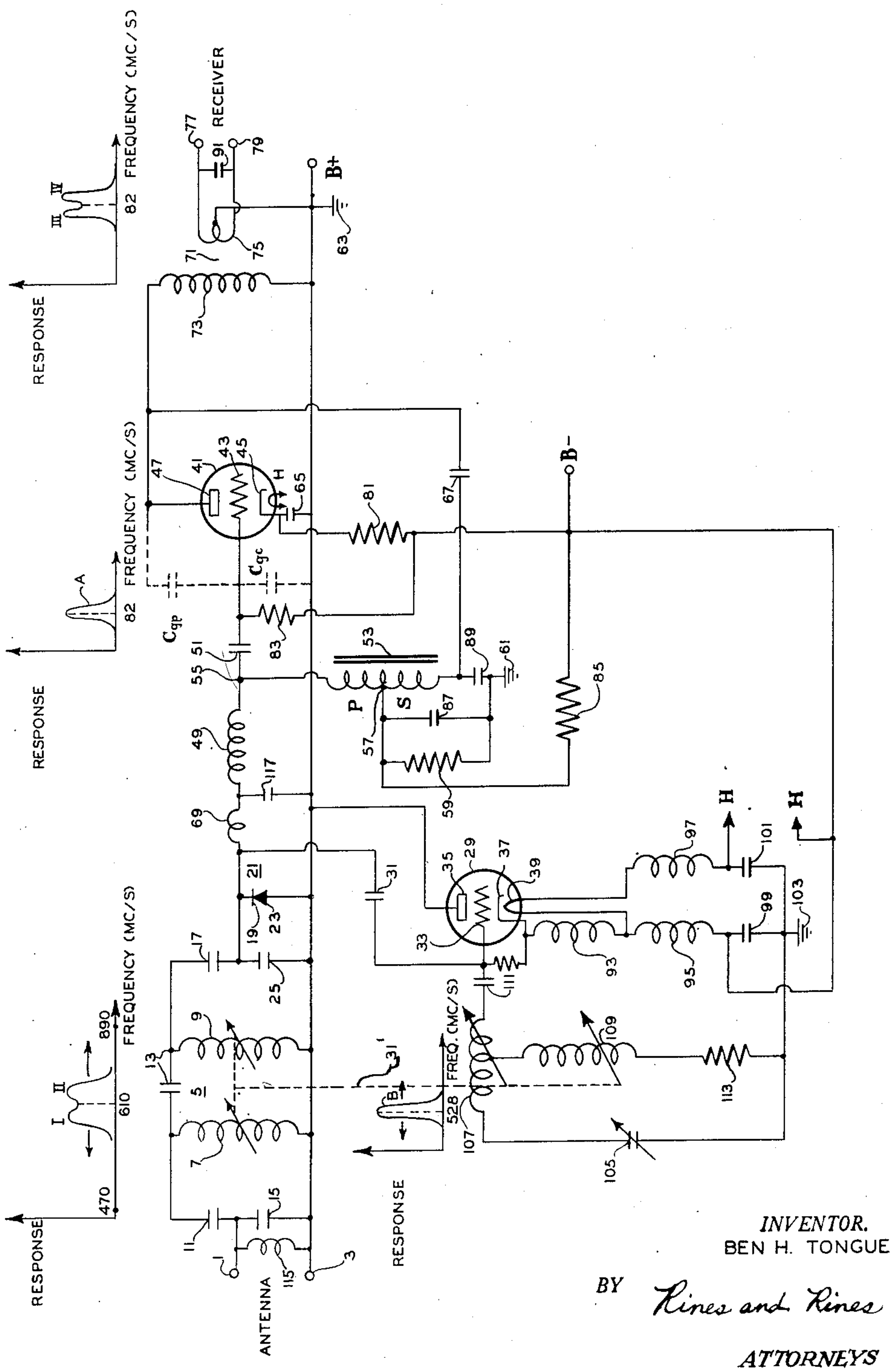
INVENTOR.
BEN H. TONGUE
BY Rines and Rines
ATTORNEYS

United States Patent Office 2,778,934

Patented Jan. 22, 1957

2,778,934

NEUTRALIZED AMPLIFIER SYSTEM FOR ULTRA-HIGH TO VERY HIGH FREQUENCY CONVERTER

Ben H. Tongue, Westfield, N. J.

Application June 15, 1953, Serial No. 361,800

5 Claims. (Cl. 250—20)

The present invention relates to amplifier systems and more particularly to systems for receiving radio frequencies, converting the received radio frequencies to a lower intermediate radio frequency and amplifying the lower intermediate radio frequency.

The technique of heterodyning incoming radio-frequency signals with oscillations from a local oscillator system to produce a lower or intermediate radio frequency which may be more easily amplified than the original radio-frequency signals has long been employed in the radio art. At the present time, very simple systems of this character are of very great importance in the television art. With the advent of the ultra-high-frequency or U. H. F. spectrum for television broadcasting, it is necessary to provide a technique whereby present-day television receivers that are adapted to tune only to the very-high-frequency or V. H. F. television bands may still be utilized, also, to receive the ultra-high-frequency television transmissions. To achieve this end, converter systems have been proposed embodying a tunable U. H. F. circuit for receiving the ultra-high-frequency transmissions, and a local oscillator for producing oscillations for mixing with the received transmissions to produce a lower or intermediate radio frequency that is of the same frequency value as the V. H. F. television channel frequencies. By thus converting the U. H. F. transmissions into V. H. F. frequencies, therefore, the present-day television receivers may be utilized to receive the U. H. F. as well as the V. H. F. channels.

In such U. H. F.-V. H. F. converter systems, however, many practical problems arise. Even very short lengths of conductors are appreciable portions of the quarter wavelength of the ultra-high-frequencies, and thus introduce spurious resonances and other effects. These converter systems, moreover, must be of small size and easily adapted for connection to present-day television receivers in order that they may be commercial and useful. Among the proposed converters of this type, are those employing an intermediate radio-frequency stage comprising a grounded-grid triode. The grounded-grid triode has a very desirable property of providing a very low noise figure. It is disadvantageous, however, since it inherently provides very low gain. In order to increase the gain, it has been proposed to employ a double-triode or cascode stage as the intermediate-frequency amplifier. The cascode system provides high gain consistent with the relatively low noise figure of a triode. Such a system, however, is rather costly and is therefore disadvantageous insofar as meeting the commercial demand for low-cost converters adapted for use with present-day television systems. The high cost of the cascode system has been somewhat overcome by employing a pentode intermediate-frequency or I. F. stage. The pentode provides the same high gain as the cascode system but it does so with less costly circuitry. The pentode, however, has a noise figure three to four decibels worse than the noise figure of the cascode system, so that in order to achieve low-cost, one must sacrifice a considerable measure of the performance of the converter.

An object of the present invention is to provide a simple and inexpensive system of the character described that shall, despite its simplicity, provide substantially the same high gain as the pentode or cascode system, but, also, the low noise figure of a triode.

A further object is to provide a new and improved intermediate radio-frequency amplifier.

Other and further objects will be explained hereinafter, and will be more particularly pointed out in the appended claims.

The invention will now be described in connection with the accompanying drawings, the single figure of which is a schematic circuit diagram illustrating the invention in preferred form. While the invention will hereinafter be described in connection with the ultra-high-frequency television band, where it has very great utility, it is to be understood that it is of broader scope being useful anywhere where the advantages of the present invention are desired.

An ultra-high-frequency antenna may be connected to the terminals 1, 3 at the left of the drawing, as by a two-wire transmission line feeding from an antenna, not shown. The terminals 1, 3 are connected to an ultra-high-frequency tunable circuit generally indicated by the numeral 5. This circuit preferably comprises ganged tunable inductances, represented schematically at 7 and 9, which may assume the form of transmission loops or sections. The terminal 1 is connected through a capacitor 11 to the upper terminal of the inductance 7 and through a further capacitor 13 to the upper terminal of the inductance 9. The lower terminal 3 is connected directly to the other terminals of the inductances 7 and 9. The terminal capacitance is illustrated at 15 between the terminals 1 and 3, and it is shunted by a coil 115 that provides a low shunt impedance for frequencies lower than the U. H. F. frequencies. The upper terminal of the inductance 9 is connected by a further capacitance 17 to the cathode 19 of a mixer 21, preferably of the crystal type. The anode 23 of the mixer 21 is connected to the lower terminal of the inductance 9. Shunting the crystal 21 is a further capacitor 25.

The tuned circuit 5 will be recognized as of the double-peak or double-resonance variety providing a pair of spaced resonant peaks. In the graph illustrated immediately above the tuned circuit 5, the double-peak response I, II is shown plotted, frequency being indicated along the abscissa of the graph, and amplitude of the signal response in the tuned circuit being plotted along the ordinate. For purposes of illustration, the inductances 7 and 9 are assumed to be tuned so that the center or dip of the double-peak response curve between the resonant peaks I and II produced by the tuned circuit 5 is about 610 megacycles, within the U. H. F. band. By varying the values of the ganged inductances 7 and 9, as schematically illustrated by the arrows and dashed lines, the double-peak response curve I, II may be moved to the left or to the right, as indicated by the arrows in the above-mentioned graph, anywhere between the limits of, for example, 470 megacycles and 890 megacycles, the limits of the U. H. F. band.

There is therefore supplied to the crystal mixer 21 the U. H. F. radio-frequency signal received from the antenna and resonated in the tuned circuit 5. As before stated, this must be heterodyned to a lower intermediate radio frequency that can be received by the lower-frequency V. H. F. television receiver circuits. To this end, there is also applied to the crystal 21 the oscillations of a local oscillator tube 29. The cathode 19 of the crystal mixer 21 is shown connected through a coupling capacitor 31 to the control electrode or grid 33 of the local oscillator electron tube 29. The capactior 31 may be an air pick-up capacitive probe so that the oscillations of the local oscillator are pick-up-probe-injected into the crystal 21. The connection of the capacitor 31 to the grid 33, furthermore, need not be physical, but may be of the capacitive probe-pick-up type, also. The details of this local oscillator will be described presently, but for present purposes, it is sufficient to invite attention to the graph shown to the left of the oscillator tube 29, illustrating the single resonant frequency B of the oscillator circuit, producing local oscillations at, say, 528 megacycles. When mixed in the crystal 21 with the 610 megacycle received ultra-high frequency signal, there is produced a predetermined intermediate radio frequency of about 82 megacycles.

The crystal 21 thus serves as a generator of the 82-megacycle predetermined intermediate radio-frequency that is to be applied to an intermediate radio-frequency amplifier tube 41. As before indicated, there are disadvantages in employing cascode stages, grounded-grid triode stages and pentode stages as the intermediate radio-frequency amplifier. One of the objects of the present invention, indeed, as previously discussed, is to provide the same high gain that could be achieved with a pentode but at much lower cost, and to provide such gain consistent with obtaining the low noise figure of a triode and not the high noise figure of a pentode. It has been discovered that this result can be obtained by producing series resonance in the input circuit of the triode amplifier tube 41 and employing a part of the inductance necessary to provide such series resonance with an appropriate capacitance simultaneously effectively to neutralize the grid-to-plate capacitance of the triode. The crystal 21, however, is of a relatively high impedance, say of the order of 250 ohms, compared with the 200-ohm-or-less impedance of the input capacitance *Cgc*, shown dotted, between the control electrode 43 and the cathode 45 of the triode 41. If one were therefore merely to resonate the series coil or inductance 49 through a coupling condenser 51 with the control electrode-to-cathode capacitance *Cgc* of the triode 41, the high impedance generator 21 would be in series with the resonant circuit including the coil 49 and the capacitance *Cgc*, so that one could not obtain a high-Q resonance.

It is therefore necessary to raise the effective input capacitive reactance of the tube 41. This is done, in accordance with the present invention, by connecting the primary winding portion P of an autotransformer 53 between the control electrode 43 and the cathode 45. The upper terminal of the autotransformer primary winding P is shown connected at 55 to the right-hand terminal of the coil 49, and thus, through the coupling condenser 51, to the control electrode 43. The lower terminal at the tap 57 of the primary winding P of the autotransformer 53 is connected through a condenser 87 to a ground connection 61. The term "ground" as used in the specification and claims is intended to connote not only actual earthing of the circuit but also chassis or any other reference potential. The ground connection 61 connects through ground to a further ground connection 63 which is, in turn, connected to the lower terminal of the grid-to-cathode capacitance *Cgc*. The cathode 45 of the triode 41 is connected through a by-pass condenser 65 to the same grounded terminal 63. By utilizing this transformer primary coil winding across the input circuit of the triode 41, the effective input capacitive reactance of the triode 41 may be raised to the order of, say, 500 ohms, so that even with a relatively high impedance crystal 21 producing the predetermined intermediate radio frequency, a high-series-resonance-Q circuit is provided. The series resonance takes place in the circuit including the crystal 21, the coil 49, the capacitance *Cgc* and the primary winding P of the autotransformer 53, inductively connecting the coil 49 to the cathode 45 of the tube 41. This particular type of series resonance input circuit in which the impedance of the crystal 21 at the predetermined intermediate radio frequency is employed in series with the resonance circuit as resistance loading therefore, provides approximately a two-times voltage step-up and a four-times impedance step-up in the input circuit. This impedance step-up of about four times is particularly adapted for a 6AB4-type triode 41 or similar tube in order to provide an impedance mis-match between the mixer 21 and the tube 41 that produces the lowest possible noise factor.

Further, in accordance with the present invention, a part of the inductance of this series-resonance input circuit, namely, the primary winding P of the autotransformer the iron core of which is shown at 53, is also utilized to produce a phase shift that may neutralize substantially the plate-to-grid capacitance, shown in dotted lines at *Cgp*, inherent in the tube 41. This result is achieved by providing an appropriate secondary winding section S for the autotransformer 53 and connecting the same through a further capacitor 67 to the plate or anode 47 of the tube 41. By having the primary and secondary windings P and S of proper length, about 180 degrees of phase shift may be produced. When the energy thus phase-shifted is coupled through the capacitor 67 to the plate or anode 47 of the tube 41 from the terminal 55, that, as before stated, is also connected through the coupling condenser 51 to the control grid electrode 43, the capacitance *Cgp* of the tube 41 is effectively substantially neutralized. For a transformer coupling between the primary and secondary of nearly unity, as may be achieved with autotransformers, this neutralization has been found to be substantially constant over wide frequency ranges, so that the neutralization is effected substantially independently of the frequency involved.

Above the series-resonance input circuit of the tube 41 is shown a further graph indicating the series-resonance response A of the input circuit at the predetermined intermediate frequency of about 82 megacycles of the series resonance circuit. Though the coil 49 and the primary winding P have been provided with inductance values adjusted to provide this series resonance A at 82 megacycles, as before stated, in order to insure that only the desired predetermined intermediate frequency is fed to this series resonance circuit, an ultra-high frequency coil 69 is connected between the cathode 19 of the crystal 21 and the coil 49. This coil 69 serves with the condenser 25 and a further condenser 117, connected from the junction of the inductances 69 and 49 to the ground terminal 63, as a $\pi$-section, constant K, low-pass V. H. F. filter, keeping the ultra-high frequency energy in the tuned circuit 5 out of the input circuit of the triode 41.

With the above-described series-resonance input circuit, a portion of the inductance of which provides, also, for a phase shift that may simultaneously neutralize the grid-to-plate capacitance of the tube 41, it is desirable to connect a step-down transformer 71 in the output circuit of the tube 41. The primary winding 73 of such a step-down transformer is shown connected between the anode 47 of the triode 41 and the ground terminal 63. This ground terminal is, in turn, connected to the positive or B+ side of the power supply, the system thus operating conveniently with a grounded B+ anode-potential source. In view of the use of such a grounded B+ anode-potential source, the secondary winding 75 of the step-down transformer 71 is conveniently wound upon the primary winding 73 as a bifilar winding with only air insulation, though it is schematically illustrated to the right of the winding 73. No further insulation or expensive windings are necessary in connection with the step-down transformer 71 in view of the use of the grounded B+ connection that is made possible by the circuit of the present invention. The output of the amplifier 41 is thus stepped down and applied to terminals 77 and 79 that may connect to the V. H. F. television receiver system. The B— or negative terminal of the anode-potential source is connected through a biasing resistor 81 to the cathode 45 of the tube 41. Bias for the control electrode 43 of the triode 41 is obtained, also, from the B— terminal through a further resistor 83. If desired, the grid-leak bias provided by the resistor 83 may suffice, and the cathode bias resistor 81 may be eliminated. The crystal 21, in addition, obtains bias from the B— terminal through an additional resistor 85 in the circuit traceable through the resistor 85, the primary winding P of the autotransformer 53, the coil 49 and the coil 69 to the cathode 19 of the crystal mixer 21. The before-mentioned condenser 87 is shown shunted to the grounded terminal 61 by a resistor 59. The lower terminal of the secondary winding S of the autotransformer 53 is shown connected through a further condenser 89 to the ground terminal 61, this further condenser 89 cooperating with the autotransformer 53 and the condenser 67 as part of the previously described neutralization circuit to render the neutralization more constant over the intermediate radio-frequency band.

The step-down transformer 71 is doubly peaked by tuning the same in conjunction with the anode-to-cathode capacitance of the tube 41 across the primary winding 73 and the output terminal capacitance 91 appearing across the step-down secondary winding 75. This double-resonance response provides resonance peaks which are tuned to fall below and above the predetermined intermediate frequency of about 82 megacycles, as shown in the graph immediately above the step-down transformer 71, at III and IV.

As an illustration of the results obtainable in practice with the circuit of the present invention, employing both the series-resonance-produced voltage and impedance step-up in the input of the amplifier 41 and the neutralization of the grid-to-plate capacitance of the tube 41 effected with the aid of a portion of the inductance necessary for such series resonance, a 16½ decibel gain factor has been easily obtained utilizing a 6AB4 triode 41. This is more than fifty percent more gain than can be obtained utilizing the same triode as a grounded-grid amplifier. It represents more gain than is usually obtained, furthermore, even with a pentode intermediate-frequency amplifier tube. Unlike the pentode, however, which has a 6 decibel noise factor, the present invention, since it enables the use of the triode 41, has a very low noise figure of the order of about 3 decibels. The use of the triode 41, moreover, permits the tube to draw only about 4 or 5 milliamperes from the anode-potential supply. This is about half the current drain required by pentodes and about one-third that required by the before-described cascode circuit. In addition, much less heater current drain is required in the heater winding H used to heat the cathode 45 of the tube 41 than in the case of the pentode and cascode stages. In addition to providing, therefore, at least the gain of a pentode, but with the low noise factor of a triode, the present invention provides further marked savings in the power-supply requirements of the circuit.

Since the circuit enables the use of the grounded B+ anode-potential supply, furthermore, advantage may be taken of this fact in simplifying the circuit of the local oscillator tube 29. As in the case of the triode 41, the local oscillator cathode 37 is connected to the ungrounded B— terminal of the anode-potential supply source, but it is so connected through a pair of coils 93 and 95. The cathode 37 is heated by a heater 39 current to which is supplied from the heater source labeled H through the coil 95 and a further similar coil 97. The heater is decoupled by condensers 99 and 101 to a ground terminal 103 that makes connection through ground to the before-ground terminals 61 and 63. The local oscillator tuned circuit is shown comprising a tunable condenser 105 and tunable inductances 107 and 109. The lower terminal of the condenser 105 is connected to the ground terminal 103, and the upper terminal of the condenser 105 is connected through the tunable inductance 107 and through a coupling condenser 111 to the control electrode 33 of the local oscillator tube 29. From an intermediate point of the inductance 107, the other inductance 109 is connected. The inductance 109 further connects through a resistor 113 to the ground terminal 103. The plate or anode 35 of the oscillator 29 is conveniently connected to the lower terminal of the primary winding 73 which, in turn, is connected to the grounded positive terminal B+ of the anode-potential supply. The tubes 29 and 41, therefore, both employ grounded plates or anodes, and cathodes maintained at ungrounded negative potentials.

The inductances 107 and 109 of the tuned circuit of the local oscillator 29 are shown connected by a ganged connection 31' to the dash-line ganging controlling the tuning of the inductance elements 7 and 9 of the U. H. F. receiving tuned circuit 5. As the tuned circuit 5 is tuned to various frequencies within the U. H. F. or other desired band, therefore, the local oscillator tuning tracks therewith in order to maintain the local oscillator frequency at the necessary value in order always to produce the desired predetermined intermediate frequency, such as the before-mentioned 82 megacycles. The inductances 107, 109, like the inductances 7 and 9, may assume the form of coils, transmission lines, loops or other devices.

Further modifications will occur to those skilled in the art and all such are considered to fall within the spirit and scope of the invention, as defined in the appended claims.

What is claimed is:

1. An electric system for amplifying a predetermined radio frequency having, in combination, an electron tube provided with an anode, a cathode and a control electrode, an input circuit comprising a coil connected to the control electrode and capacitively and inductively connected to the cathode through the capacitance of the tube between its control electrode and cathode and the primary winding of a closely coupled autotransformer, respectively, the inductance of the coil being tuned with the said capacitance and the inductance of the primary winding of the autotransformer to resonate at the predetermined radio frequency, means for connecting the secondary winding of the autotransformer through a capacitor to the anode of the tube, the primary and secondary autotransformer windings being of value to produce substantially a 180-degree phase shift between the control electrode and the connection between the secondary winding and the said capacitor sufficient substantially to neutralize the control electrode-to-anode capacitance of the tube, an output circuit connected between the anode and the cathode comprising a step-down bifilar transformer having a primary winding connected between the anode of the tube and ground, a source of anode potential, and means for connecting the negative terminal of the source to the cathode of the tube and the positive terminal to ground, the step-down transformer being tuned to resonate at a pair of frequencies, one above and one below the said predetermined radio frequency.

2. An electric system for amplifying a predetermined radio frequency having, in combination, an electron tube provided with an anode, a cathode and a control electrode, a crystal mixer for producing the predetermined radio frequency and of impedance relatively high compared with the control electrode-to-cathode capacitance of the tube, an input circuit fed from the crystal and comprising a coil connected to the control electrode of the tube and inductively connected through the primary winding of a closely coupled autotransformer to the cathode, the inductance of the coil being tuned with the said control electrode-to-cathode capacitance and the inductance of the primary winding of the autotransformer to resonate in circuit with the crystal at the predetermined radio frequency, thereby to raise the effective capacitive impedance between the control electrode and the cathode in order to provide a high-Q series resonance with the crystal of the said relatively high impedance, means for connecting the secondary winding of the autotransformer through a capacitor to the anode of the tube, the primary and secondary autotransformer windings being of value to produce substantially a 180-degree phase shift between the control electrode and the connection between the secondary winding and the said capacitor sufficient substantially to neutralize the control electrode-to-anode capacitance of the tube, an output circuit connected between the anode and the cathode comprising a step-down transformer having a primary winding connected between the anode of the tube and ground, a source of anode potential, means for connecting the negative terminal of the source to the cathode of the tube and the positive terminal to ground, the step-down transformer being tuned to resonate at a pair of frequencies, one above and one below the said predetermined frequency.

3. An electric system as claimed in claim 2 and in which the crystal mixer is simultaneously fed from a tunable radio-frequency receiving circuit and a synchronously tunable local oscillator adapted continuously to produce oscillations differing from the various frequencies received in the receiving circuit by the said predetermined radio frequency, the local oscillator comprising a further electron tube provided with an anode, a control electrode and a cathode, the tunable circuit of the local oscillator being connected between its control electrode and anode, means for connecting the said negative terminal of the said source of anode potential for the first-named amplifying electron tube to the cathode of the local oscillator tube, and means for connecting the anode of the local oscillator tube to the said grounded primary winding of the said step-down transformer in the said output circuit of the first-named amplifying electron tube.

4. An electric system for amplifying a predetermined radio frequency, having, in combination, a single triode electron tube provided with an anode, a signal-grounded cathode and a control electrode, an input circuit connected between the control electrode and the cathode comprising an inductance connected to the control electrode and a closely coupled autotransformer connected from the control electrode through a capacitor to the anode and provided with an intermediate tap connected to the signal-grounded cathode, the inductance and the portion of the autotransformer between the control electrode and the intermediate tap being tuned to resonate with the capacitance of the tube between its control electrode and cathode at the predetermined radio frequency, the said autotransformer being of electrical length sufficient to produce substantially a 180-degree phase-shift between the control electrode and the connection of the autotransformer to the said capacitor substantially to neutralize the control electrode-to-anode capacitance of the tube, and an output circuit connected between the anode and the cathode comprising a step-down transformer having a primary winding connected between the anode of the tube and ground, a source of anode potential, and means for connecting the negative terminal of the source to the cathode of the tube and the positive terminal to ground.

5. An electric system for amplifying a predetermined radio frequency, having, in combination, a single triode electron tube provided with an anode, a signal-grounded cathode and a control electrode, an input circuit connected between the control electrode and the cathode comprising an inductance connected to the control electrode and a closely coupled autotransformer connected from the control electrode through a capacitor to the anode and provided with an intermediate tap connected to the signal-grounded cathode, the inductance and the portion of the autotransformer between the control electrode and the intermediate tap being tuned to resonate with the capacitance of the tube between its control electrode and cathode at the predetermined radio frequency, the said autotransformer being of electrical length sufficient to produce substantially a 180-degree phase-shift between the control electrode and the connection of the autotransformer to the said capacitor substantially to neutralize the control electrode-to-anode capacitance of the tube, and an output circuit connected between the anode and the cathode comprising a step-down transformer having a primary winding connected between the anode of the tube and ground, a source of anode potential, and means for connecting the negative terminal of the source to the cathode of the tube and the positive terminal to ground, the step-down transformer being tuned to resonate at a pair of frequencies, one above and one below the said predetermined radio frequency.

References Cited in the file of this patent

UNITED STATES PATENTS

| | | |
|---|---|---|
| 1,334,118 | Rice | Mar. 16, 1920 |
| 1,704,497 | Camfield | Mar. 5, 1929 |
| 1,899,758 | Jarvis | Feb. 28, 1933 |
| 1,930,672 | Ballantine | Oct. 17, 1933 |
| 2,653,228 | Pan | Sept. 22, 1953 |